United States Patent
Nakakuki et al.

(10) Patent No.: US 6,995,801 B1
(45) Date of Patent: Feb. 7, 2006

(54) METHOD AND APPARATUS FOR CONTROLLING AN EXPOSURE PERIOD OF A SOLID-STATE IMAGING APPARATUS BASED UPON AN IMAGE SIGNAL OUTPUT

(75) Inventors: Toshio Nakakuki, Gifu-ken (JP); Tomomichi Nakai, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/499,229

(22) Filed: Feb. 7, 2000

(30) Foreign Application Priority Data

Feb. 8, 1999 (JP) ................................ 11-030377

(51) Int. Cl.
*H04N 5/238* (2006.01)

(52) U.S. Cl. ...................................... 348/364
(58) Field of Classification Search ............... 348/362, 348/363, 364, 296, 297, 298, 221.1, 229.1
See application file for complete search history.

(56) References Cited

U.S. PATENT DOCUMENTS

| | | | |
|---|---|---|---|
| 5,065,248 A | | 11/1991 | Homma |
| 5,115,269 A | * | 5/1992 | Masanaga et al. .......... 396/106 |
| 5,194,960 A | | 3/1993 | Ota |
| 5,473,375 A | | 12/1995 | Takayama et al. |
| 5,510,837 A | | 4/1996 | Takei |
| 5,606,392 A | | 2/1997 | Tintera et al. |
| 5,734,426 A | * | 3/1998 | Dong ........................ 348/297 |
| 5,751,354 A | | 5/1998 | Suzuki et al. |
| 5,793,422 A | * | 8/1998 | Mochizuki et al. ......... 348/296 |
| 6,175,384 B1 | | 1/2001 | Homma |
| 6,188,434 B1 | * | 2/2001 | Tsuchiya .................... 348/347 |
| 6,239,840 B1 | * | 5/2001 | Shibuya et al. ............ 348/362 |
| 6,480,226 B1 | | 11/2002 | Takahashi et al. |
| 6,486,915 B2 | | 11/2002 | Bell et al. |

FOREIGN PATENT DOCUMENTS

JP 03101384 * 4/1991

* cited by examiner

*Primary Examiner*—Thai Tran
*Assistant Examiner*—Timothy J. Henn
(74) *Attorney, Agent, or Firm*—Sheridan Ross P.C.

(57) ABSTRACT

An imaging apparatus having a solid-state image sensor, such as a CCD, accumulates information charges corresponding to an image of an object and generates an image signal using the stored charges. A driver provides clock signals to the sensor which define vertical and horizontal scan periods, so that the information charges are accumulated in a predetermined exposure period, in accordance with a timing signal. A first exposure information generating circuit determines whether a level of the image signal is within an appropriate range and produces first exposure information based on the determination results. A second exposure information generating circuit calculates second exposure information using the image signal. A selector selects the first exposure information when the level of the image signal is outside of the predetermined exposure period and selects the second exposure information when the image signal is within the predetermined exposure period. A timing control circuit receives the selected exposure information from the selector and generates the timing signal.

11 Claims, 3 Drawing Sheets

METHOD AND APPARATUS FOR CONTROLLING AN EXPOSURE PERIOD OF A SOLID-STATE IMAGING APPARATUS BASED UPON AN IMAGE SIGNAL OUTPUT

BACKGROUND OF THE INVENTION

The present invention relates to a solid-state imaging apparatus, and more particularly, to a solid-state imaging apparatus having an exposure control function.

FIG. 1 is a schematic block diagram of a conventional solid-state imaging apparatus 100 and FIG. 2 is a timing waveform chart which describes the operation of the solid-state imaging apparatus 100. The solid-state imaging apparatus 100 includes a CCD image sensor 1, a driver 2, a timing control circuit 3, an integrating circuit 4, a decision circuit 5, an up/down counter 6 and a latch circuit 7.

The CCD image sensor 1 has a plurality of light receiving pixels, a plurality of vertical shift registers and a horizontal shift register. The light receiving pixels are arranged on a light receiving surface in lines at predetermined intervals, and generate and store information charges corresponding to an object image. The vertical shift registers are arranged in columns corresponding to the lines of light receiving pixels, and sequentially transfer the information charges stored in each of the light receiving pixels in the vertical direction. The horizontal shift register is arranged on the output side of the vertical shift registers, receives the information charges output from the vertical shift registers, and outputs the charges in a unit of one line. In this manner, an image signal Y with a changing a voltage value in accordance with the information charges stored in the light receiving pixels is output.

The driver 2 supplies each shift register of the CCD 1 with a multi-phase transfer clock in response to a vertical synchronous signal VD and a horizontal synchronous signal HD from the timing control circuit 3. The driver 2 produces a frame transfer clock φF in response to the vertical synchronous signal VD and supplies the vertical shift register with the frame transfer clock φF. The information charges stored in the light receiving pixels are transferred to the vertical shift registers every vertical scanning period in accordance with the frame transfer clock φF. The driver 2 produces a storage transfer clock φS and a horizontal transfer clock φH in response to the horizontal synchronous signal HD. The vertical shift registers transfer the information charges to the horizontal shift register in accordance with the storage transfer clock φS, and the horizontal shift register outputs the information charges in a unit of one line in accordance with the horizontal transfer clock φH. The driver 2 produces a drain clock φD in response to a shutter timing signal ST from the timing control circuit 3. The drain clock φD is supplied to an unnecessary charge drain region of the CCD 1 and the information charges stored in the light receiving pixels are drained to this drain region. A period L from the end of the drain clock φD to the start of the frame transfer clock φF is defined as the information charges storage period, or the so-called exposure time.

The timing control circuit 3 frequency-divides a reference clock CK having a predetermined period and produces the vertical synchronous signal VD which determines the vertical scan timing of the CCD 1 and the horizontal synchronous signal HD which determines the horizontal scan timing. For example, in conformity with the NTSC (National Television System Committee) standard, the horizontal synchronous signal HD is produced by setting the reference clock CK to 14.32 MHz and frequency-dividing it into 910 parts. The vertical synchronous signal VD is produced by further frequency-dividing the horizontal synchronous signal HD into 252.5 parts.

The integrating circuit 4 integrates the image signal Y output from the CCD 1 in units of a vertical scan periods and produces integration value information IY which is proportional to the average level of the image signal Y. The integrating circuit 4 is reset with the vertical synchronous signal VD.

The decision circuit 5 receives the integration value information IY from the integrating circuit 4, compares the integration value information IY with upper and lower limits which correspond to an appropriate vertical scanning period exposure range, and activates an exposure suppression signal CL or an exposure acceleration signal OP based on the comparison results. If the integration value information IY exceeds the upper limit, the exposure suppression signal CL is activated, and if the integration value information IY is below the lower limit, the exposure acceleration signal OP is activated.

The up/down counter 6 performs an up count operation when the exposure suppression signal CL is activated and performs a down count operation when the exposure acceleration signal OP is activated. A counted value of the up/down counter 6 corresponds to a horizontal scan line number and the timing of the shutter timing signal ST is determined in accordance with the horizontal scan line number.

The latch circuit 7 latches the counted value of the up/down counter 6 every vertical scan period in accordance with the vertical synchronous signal VD and supplies the timing control circuit 3 with the counted value as exposure information D. There are plurality of horizontal scan periods for each vertical scan period. The timing control circuit 3 activates the shutter timing signal ST based on the exposure information D when the horizontal scan period, which corresponds to the counted value of the up/down counter 6, has elapsed from the start of the vertical scanning period. The exposure time L is extended or shortened every vertical scan period in a unit of one horizontal scan period by performing the up count or down count operation in accordance with the integration value information-IY of the image signal Y.

If the level of an image signal is within the range of appropriate exposure, as determined by the decision circuit 5, the exposure time L is not extended or shortened, and system control circuit does not respond to a slight change of luminance of the sensed object. Therefore, a change in the object luminance appears as a change in the image signal. Accordingly, if the brightness of illumination is not stable, the brightness of the illumination appears on a reproduction screen. Further, if a light source which emits light periodically is used, the emission period and imaging period of the light source may substantially coincide. In this case, if a jitter is contained in the emission period of the light source, the average level of the image signal varies due to the jitter. The fluctuation of the average level of such image signal causes a flicker having a long period on the reproduction screen.

SUMMARY OF THE INVENTION

It is an object of the present invention to provide a solid-state imaging apparatus with accurate exposure timing. A solid-state imaging apparatus, comprising:

In one aspect of the present invention, a solid-state imaging apparatus is provided. The imaging apparatus includes a solid-state image sensor for accumulating information charges corresponding to an image of an object and generating an image signal in response to the information charges. The image sensor includes a driver, connected to the image sensor, for driving the image sensor in accordance with a timing signal so that the information charges are accumulated in a predetermined exposure period, and for outputting the image signal from the image sensor. A first exposure information generating circuit determines whether a level of the image signal output from the image sensor is within a predetermined range and produces first exposure information based on the determination results. A second exposure information generating circuit calculates second exposure information using the image signal output from the image sensor. A selection circuit is connected to the first and second exposure information generating circuit s to select the first exposure information when the level of the image signal is outside of the predetermined range and select the second exposure information when the level of the image signal is within the predetermined range. A timing control circuit is connected to the driver to receive the exposure information selected by the selection circuit and generates the timing signal therefrom. The timing signal defines the predetermined exposure period.

In another aspect of the present invention, a method for controlling an exposure period of a solid-state imaging apparatus is provided. The imaging apparatus includes a solid-state image sensor which accumulates information charges corresponding to an object image and generates an image signal in response to the information charges. First, the solid-state image sensor is driven in accordance with a timing signal so that the information charges are accumulated within the exposure period and the image signal is output. Then, whether a level of the image signal output from the solid-state image sensor is within a predetermined range is determined and first exposure information is generated based on the determination results. Second exposure information is calculated using the image signal output from the solid-state image sensor. Then, the first exposure information is selected when the level of the image signal is outside of the predetermined range and the second exposure information is selected when the level of the image signal is within the predetermined range. The timing signal for setting the exposure period is generated in accordance with the selected exposure information.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
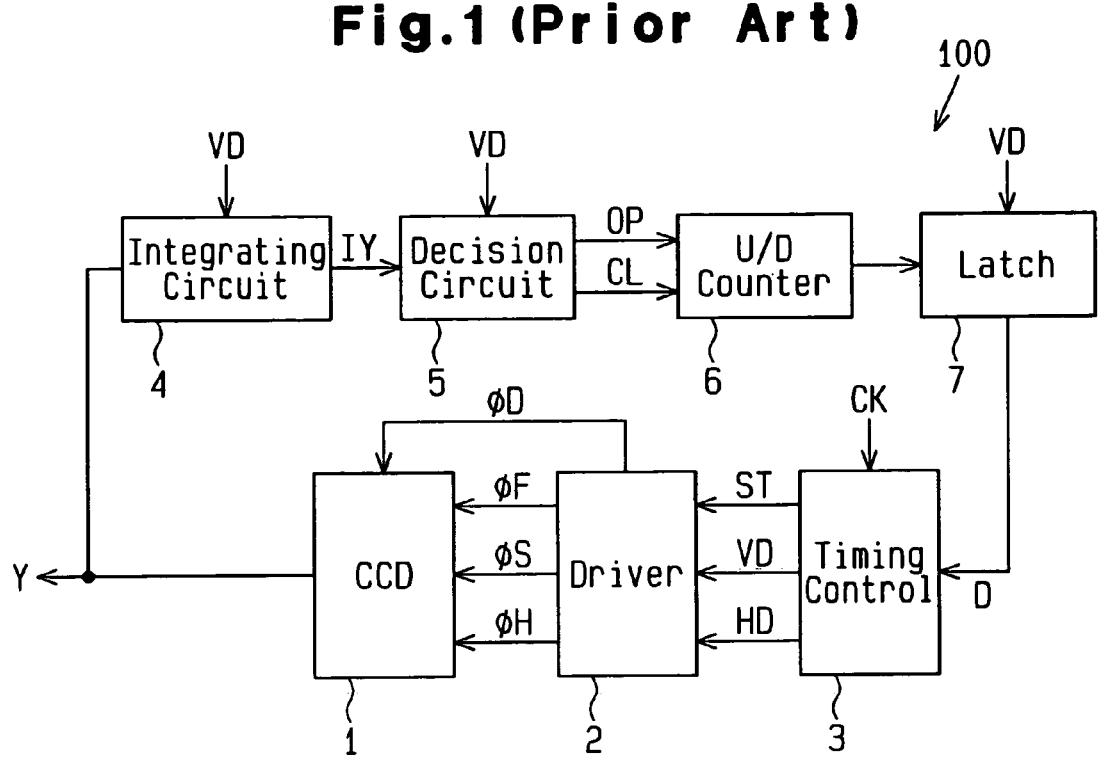
FIG. 1 is a schematic block diagram of a conventional solid-state imaging apparatus.
Figure 2:
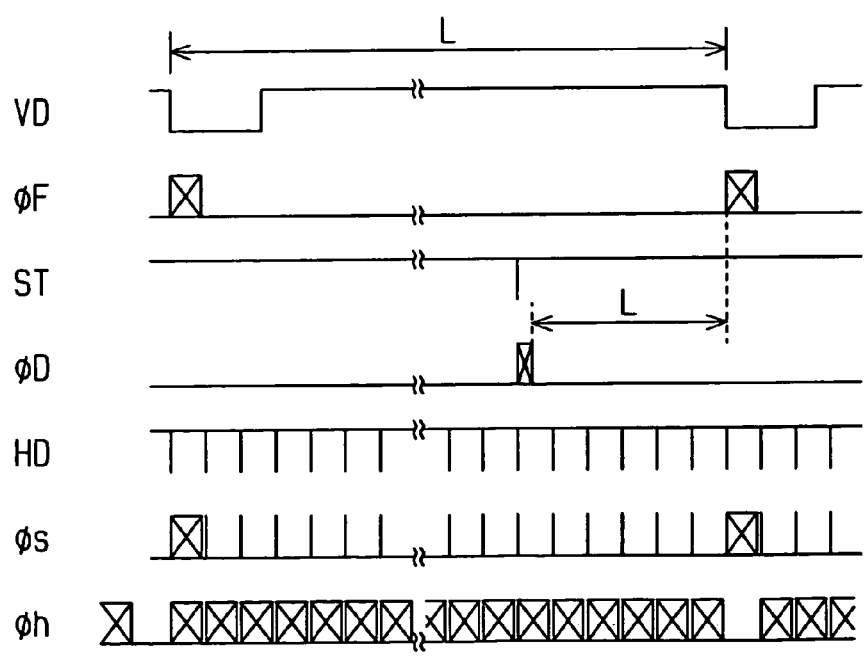
FIG. 2 is a timing chart which describes the operation of the solid-state imaging apparatus of FIG. 1.

In the drawings, like numerals are used for like elements throughout.

Figure 3:
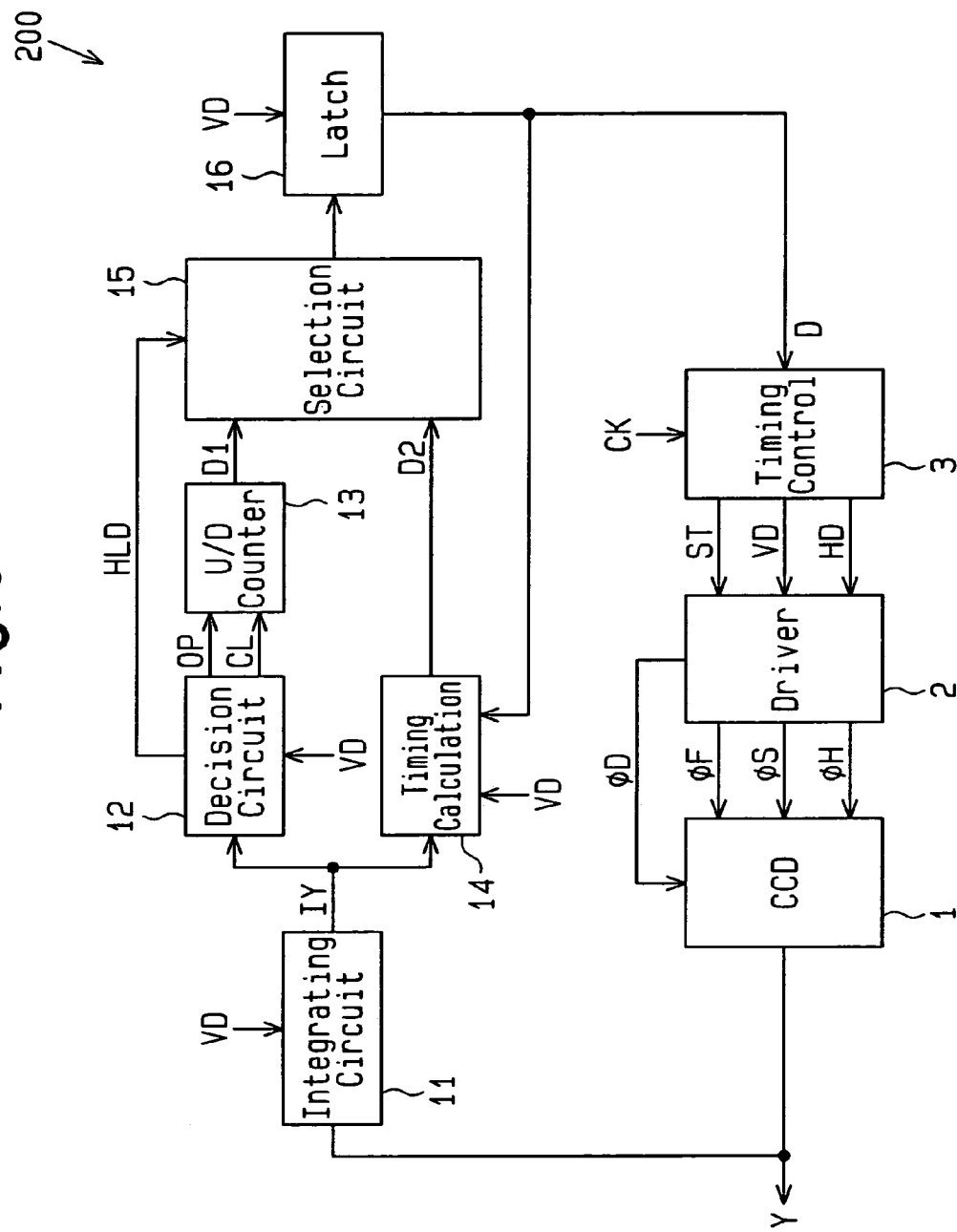
FIG. 3 is a schematic block diagram of a solid-state imaging apparatus according to one embodiment of the present invention.
Figure 4:
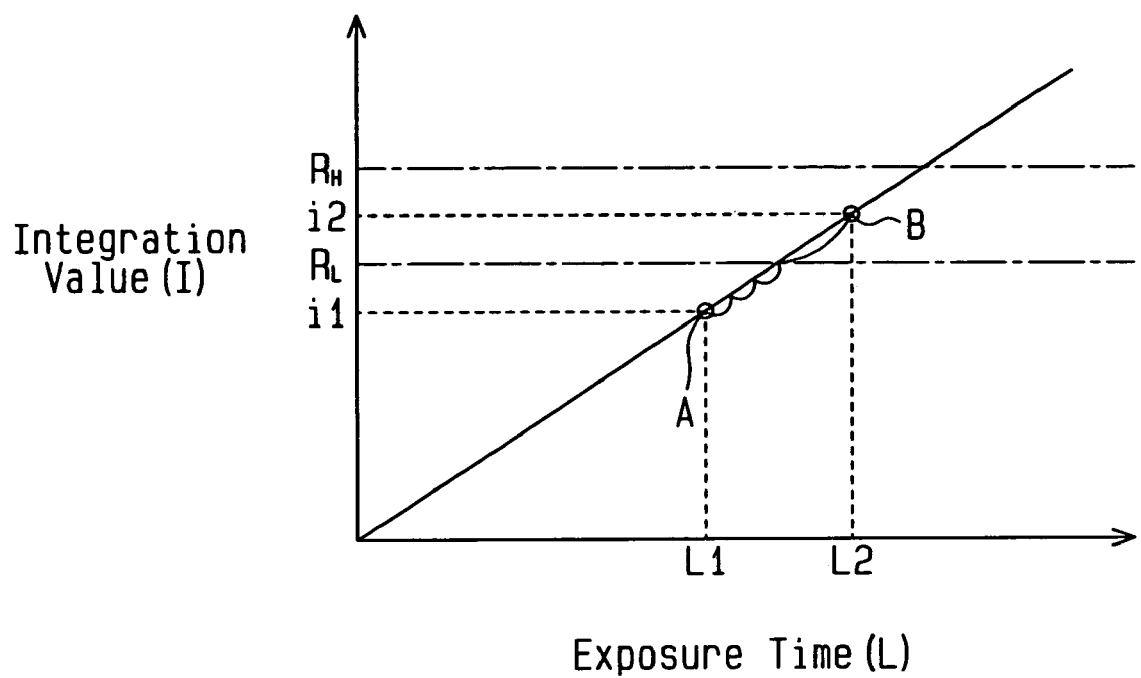
FIG. 4 is a graph showing the relationship between an exposure time and the integration value of an image signal.

FIG. 3 is a schematic block diagram of a solid-state imaging apparatus 200 according to one embodiment of the present invention, and FIG. 4 is a graph showing the relationship between the exposure time of a CCD image sensor 1 and an integration value of an image generated by the apparatus 200.

The solid-state imaging apparatus 200 comprises the CCD image sensor 1, the driver 2, the timing control circuit 3, an integrating circuit 11, an exposure decision circuit 12, an up/down counter 13, a timing calculation circuit 14, a selection circuit 15 and a latch circuit 16. The driver 2 pulse-drives the CCD image sensor 1 in accordance with various signals from the timing control circuit 3 and an image signal Y is output from the CCD image sensor 1.

In one embodiment of the present invention, first exposure information D1 for controlling a length of the exposure time L of the CCD image sensor 1 in a predetermined step and second exposure information D2 for specifying the optimum exposure time length L are selectively supplied to the timing control circuit 3. More specifically, if the exposure state of the CCD image sensor 1 is out of the predetermined range, the first exposure information D1 is supplied to the timing control circuit 3. After the exposure state of the CCD image sensor 1 has become appropriate (i.e., within the predetermined range) by either extending or shortening the exposure time L based on the first exposure information D1, the second exposure information D2 is supplied to the timing control circuit 3.

The integrating circuit 11 integrates an image signal Y output from the CCD image sensor 1 each vertical scan period and generates integration value information IY which proportional to the average level of the image signal Y.

The exposure decision circuit 12 receives the integration information IY from the integrating circuit 11, compares the integration value information IY with upper and lower limits of the predetermined exposure range, and activates any one of an exposure suppression signal CL, an exposure acceleration signal OP and an exposure fixed signal HLD based on the compare result. Specifically, if the integration value information IY exceeds the upper limit, the exposure suppression signal CL is activated. If the integration value information IY is below the lower limit, the exposure acceleration signal OP is activated. If the integration value information IY is between the upper and lower limits, the exposure fixed signal HLD is activated. The exposure decision circuit 12 is reset with a vertical synchronous signal VD.

The up/down counter 13 performs an up count operation in response to the exposure suppression signal CL and performs a down count operation in response to the exposure acceleration signal OP. The counter value of the up/down counter 13 is supplied to the selection circuit 15 as the first exposure information D1. The first exposure information D1 corresponds to a horizontal scan line number which determines the activation timing of a shutter timing signal ST output from the timing control circuit 3. The first exposure information D1 (counter value) is updated every vertical scan period and is incremented and decremented by one during each vertical scan period. By the increment and decrement of the counter value, the exposure time L of the CCD image sensor 1 is extended or shortened in units of one horizontal scan period. The exposure decision circuit 12 and the up/down counter 13 form a first exposure information generating circuit.

The timing calculation circuit 14 holds exposure information D which is output from the latch circuit 16 and corresponds to the current exposure time L of the CCD image sensor 1 and calculates the second exposure information D2 using the ratio of the integration value information IY to the exposure information D and the optimum value R0 which corresponds to the optimum exposure state. That is, the second exposure information D2 is calculated in accordance with the following expression:

$$D2 = R0 \times D / IY$$

The optimum value R0 is a predetermined value. The second exposure information D2 is calculated when the integration value information IY and the exposure information D are determined, and the activation timing of the shutter timing signal ST by the timing control circuit 3 is determined based on the second exposure information D2. The timing calculation circuit 14 serves as a second exposure information generating circuit.

The selection circuit 15 is connected to the up/down counter 13 and the timing calculation circuit 14 and selects the first exposure information D1 or the second exposure information D2 in response to the exposure fixed signal HLD. That is, if the exposed state of the CCD1 is outside of the predetermined, appropriate range and thus, the exposure fixed signal HLD is not activated, the first exposure information D1 is selected. In response, the exposure time L is extended or shortened every vertical scan period in units of one horizontal scan period based on the first exposure information D1. If the exposure state of the CCD image sensor 1 is within the appropriate range and the exposure fixed signal HLD is activated, the second exposure information D2 is selected. In this case, the exposure time L is determined based on the second exposure information D2.

The latch circuit 16 latches the exposure information selected by the selection circuit 15 in accordance with a vertical synchronous signal VD and supplies the timing control circuit 3 and the timing calculation circuit 14 with the exposure information D.

Next, the operation of the solid-state imaging apparatus 200 is described. Until the exposure state is included within the appropriate range, the exposure time L is extended or shortened based on the first exposure information D1 in the same manner as a conventional example. If the exposure state is included within the appropriate range, the exposure time L is determined in units of one step based on the second exposure information D2.

For example, as shown in FIG. 4, at point A of the graph which corresponds to the exposure time L (L1), if the corresponding integration value information IY (i1) does not reach the appropriate lower limit RL, the first exposure information D1 is selected and the exposure time L is extended by one horizontal scan period. The extension of the exposure time L is repeated until the integration value information IY exceeds the appropriate lower limit RL. If the integration value information IY exceeds the lower limit RL, the first exposure information D1 is switched to the second exposure information D2. Then, the exposure time L2 which corresponds to the intermediate optimum value i2 between the upper limit RH and the lower limit RL is determined based on the second exposure information D2. Thus, the exposure state converges at point B of the graph of FIG. 4.

As described above, according to one embodiment of the present invention, the exposure time control of the CCD image sensor 1 is always performed and the exposure state converges at the optimum value within the appropriate range. At this time, since the exposure time is adjusted every horizontal scan period until the exposure state is within the appropriate range, a sudden change of an image signal level due to a sudden change of the exposure time is prevented. Further, even after the exposure state is within the appropriate range, exposure control is performed. Thus, the average level of the image signal Y becomes stable without being affected by a change in the brightness of illumination and the emission period.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

The invention claimed is:

1. A solid-state imaging apparatus, comprising:
    a solid-state image sensor for accumulating information charges corresponding to an image of an object and generating an image signal in response to the information charges;
    a driver, connected to the image sensor, for driving the image sensor in accordance with a timing signal so that the information charges are accumulated in a predetermined exposure period, and for outputting the image signal from the image sensor;
    a first exposure information generating circuit for determining whether a level of the image signal output from the image sensor is within a predetermined range and producing first exposure information which is incremented or decremented based in units of predetermined steps on the determination results;
    a second exposure information generating circuit for calculating second exposure information using the image signal output from the image sensor and a predetermined optimum value;
    a selection circuit, connected to the first and second exposure information generating circuit s, for selecting the first exposure information when the level of the image signal is outside of the predetermined range and selecting the second exposure information when the level of the image signal is within the predetermined range; and
    a timing control circuit, connected to the driver, for receiving the exposure information selected by the selection circuit and generating a new timing signal in accordance with the selected exposure information, wherein the new timing signal defines a new exposure period.

2. The solid-state imaging apparatus of claim 1, wherein the predetermined range is defined by upper and lower limits, the first exposure information includes a first exposure period, and the first exposure information generating circuit compares the level of the image signal with the upper and lower limits, decreases the first exposure period by a predetermined unit when the level of the image signal exceeds the upper limit and increases the first exposure period by the predetermined unit when the level of the image signal is below the lower limit.

3. The solid-state imaging apparatus of claim 2, wherein the second exposure information generating circuit receives exposure information selected from the selection circuit and calculates the second exposure information using a ratio of the selected exposure information to the level of the image signal and a reference value which corresponds to a reference exposure state.

4. The solid-state imaging apparatus of claim 1, wherein the first exposure information generating circuit further includes:
- an exposure decision circuit for determining, every predetermined period, whether the level of the image signal output from the image sensor is within the predetermined range and generating a decision signal; and
- an up/down counter, connected to the exposure decision circuit, for performing an up count operation or a down count operation in accordance with the decision signal, and generating the first exposure information.

5. The solid-state imaging apparatus of claim 4, wherein the second exposure information generating circuit includes a timing calculation circuit for receiving the exposure information selected by the selection circuit and calculating the second information which specifies an optimum exposure time using the selected exposure information and the image signal.

6. The solid-state imaging apparatus of claim 1, wherein the driver supplies a drain clock signal for draining the information charges stored in the image sensor and a transfer clock signal for transferring the stored information charges, and the timing control circuit supplies the driver with a second timing signal for producing the drain clock signal and the transfer clock signal according to the selected exposure information.

7. The solid-state imaging apparatus of claim 1, wherein the image sensor generates an image signal for one field during a vertical scan period and a plurality of horizontal scan periods, and the first exposure information generating circuit updates the first exposure information every vertical scan period.

8. The solid-state imaging apparatus of claim 1, wherein the second exposure information includes optimum exposure time information.

9. A method for controlling an exposure period of a solid-state imaging apparatus including a solid-state image sensor which accumulates information charges corresponding to an object image and generates an image signal in response to the information charges, comprising the steps of:
- driving the solid-state image sensor in accordance with a timing signal so that the information charges are accumulated within the exposure period and the image signal is output;
- determining whether a level of the image signal output from the solid-state image sensor is within a predetermined range and generating first exposure information which is incremented or decremented in units of predetermined steps based on the determination results;
- calculating second exposure information using the image signal output from the solid-state image sensor and a predetermined optimum value:
- selecting the first exposure information when the level of the image signal is outside of the predetermined range and selecting the second exposure information when the level of the image signal is within the predetermined range; and
- generating the timing signal for setting the exposure period in accordance with the selected exposure information.

10. The method of claim 9, wherein the solid-state image sensor generates the image signal for one screen during a vertical scan period and a plurality of horizontal scan periods, and the step of generating the first exposure information includes updating the first exposure information every vertical scan period.

11. The method of claim 10, wherein the second exposure information includes optimum exposure time information.

* * * * *